United States Patent [19]
Ono et al.

[11] Patent Number: 5,298,293
[45] Date of Patent: Mar. 29, 1994

[54] METHOD OF MANUFACTURING A ROTARY ANODE TYPE X-RAY TUBE

[75] Inventors: Katsuhiro Ono, Utsunomiya; Hidero Anno; Hiroyuki Sugiura, both of Ootawara; Takayuki Kitami, Tochigi; Minoru Shida, Ootawara, all of Japan

[73] Assignee: Kabushiki Kaisha Toshiba, Kawasaki, Japan

[21] Appl. No.: 799,162

[22] Filed: Nov. 27, 1991

[30] Foreign Application Priority Data

Nov. 28, 1990 [JP] Japan .................................. 2-323285

[51] Int. Cl.⁵ .............................................. B05D 3/12
[52] U.S. Cl. ........................................ 427/560; 427/65; 427/72; 427/256; 427/294; 427/383.1; 427/600
[58] Field of Search ..................... 427/57, 294, 65, 72, 427/560, 600, 256, 383.1

[56] References Cited

U.S. PATENT DOCUMENTS

| | | | |
|---|---|---|---|
| 4,210,371 | 7/1980 | Gerkema et al. | 308/9 |
| 4,614,445 | 9/1986 | Gerkema et al. | 384/368 |
| 4,644,577 | 2/1987 | Gerkema et al. | 378/133 |

FOREIGN PATENT DOCUMENTS

| | | |
|---|---|---|
| 0136782 | 4/1985 | European Pat. Off. . |
| 0248480 | 12/1987 | European Pat. Off. . |
| 0384705 | 8/1990 | European Pat. Off. . |
| 56-056770 | 7/1981 | Japan . |
| 57-190763 | 2/1983 | Japan . |

*Primary Examiner*—Bernard Pianalto
*Attorney, Agent, or Firm*—Cushman, Darby & Cushman

[57] ABSTRACT

A method of manufacturing an X-ray tube comprises the steps of applying the bearing portions with liquid metal lubricant and heating the bearing portions defined by a rotary structure and a stationary shaft to a temperature of 200° C. or more in a vacuum condition. An apparatus for manufacturing an X-ray tube comprises a vacuum bell jar having a heating unit, a metal lubricant injector provided in the vacuum bell jar and a holding and controlling device for holding the rotary structure and the stationary shaft and controlling the movement and the mutual connection of the rotary structure and stationary shaft externally of the vacuum envelope.

13 Claims, 5 Drawing Sheets

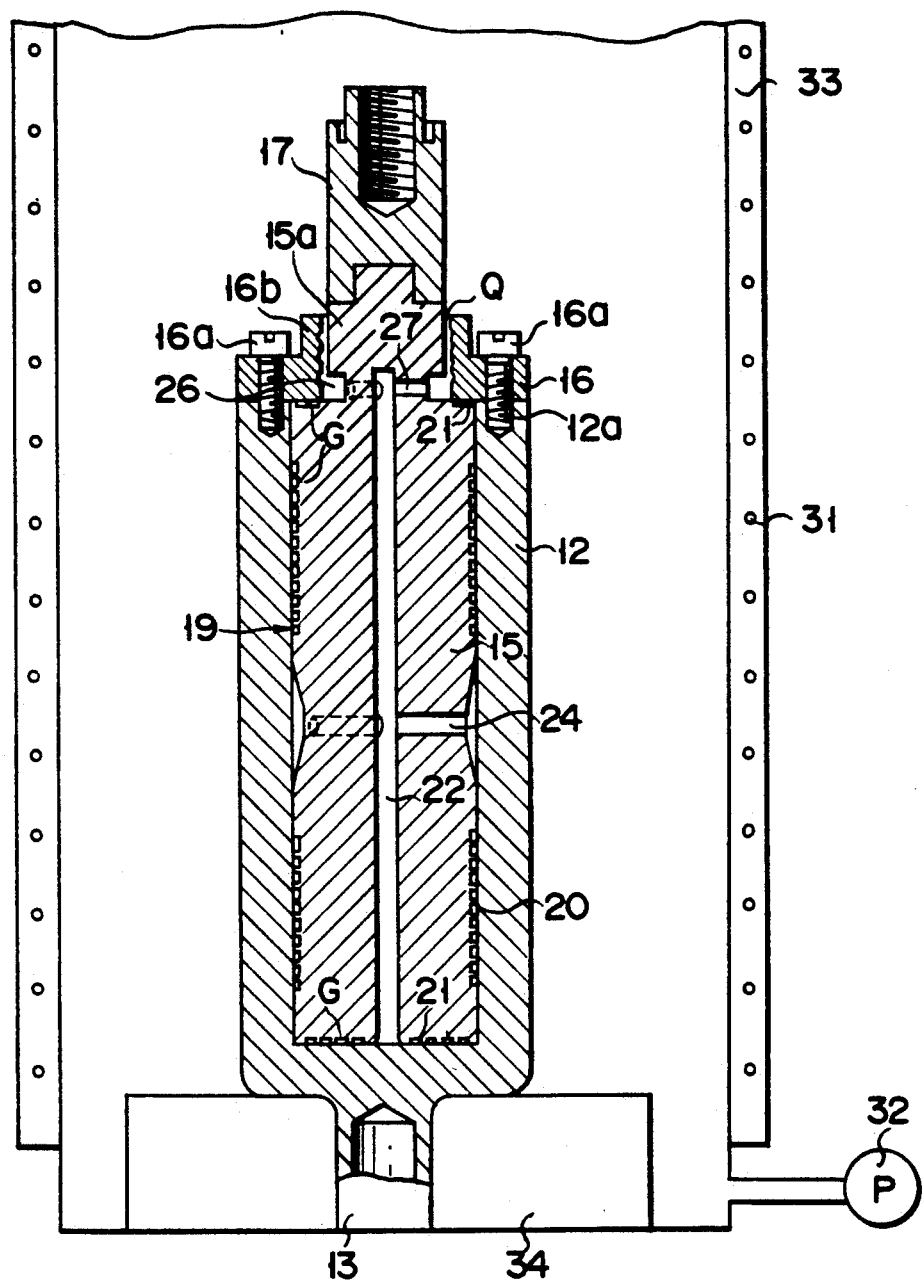
F I G. 3

METHOD OF MANUFACTURING A ROTARY ANODE TYPE X-RAY TUBE

BACKGROUND OF THE INVENTION

1. Field of the Invention

This invention relates to a method of a manufacturing a rotary anode type X-ray tube and an apparatus for manufacturing the same.

2. Description of the Related Art

As known well, a rotary anode type X-ray tube has a disc-shaped anode target supported by a rotary structure and a stationary structure between which a bearing portion is formed. As the target is rotated at a high speed by a rotating magnetic field generated from the electromagnetic coil of a stator arranged outside of an vacuum envelope, the electron beam emitted from a cathode is radiated on the anode target to irradiate X-rays. The bearing portions are constituted by rolling bearings, such as a ball bearing, or a dynamic pressure type sliding bearing which has bearing surfaces with spiral and helical grooves and uses a metal lubricant consisting of, e.g. gallium (Ga), or a gallium-indium-tin (Ga-In-Sn) alloy filled in a bearing gaps. Examples using the sliding bearings are disclosed in Japanese Laid-open Patent Disclosures No. 60-21463, No. 60-97536, No. 60-117531, No. 62-287555 and No. 2-227948.

In the rotary anode type X-ray tube disclosed in the Disclosures, the bearing surfaces of the dynamic sliding bearing which has spiral and helical grooves are faced to have the bearing gap of 20 micrometers or so, and a liquid metal lubricant is filled in the bearing gap and the spiral and helical grooves. If air or gas is left in the bearing portions or is discharged from lubricant or bearing parts such as the rotary structure and stationary structure, the bearing surfaces become oxidized and are not wetted well by the lubricant. In some cases, bubbles prevent some portions of the bearing surfaces from being coated with liquid metal lubricant. When the assembled X-ray tube is operated, the temperature of the bearing portions rises to about 200° C. Thus, gas is sometimes discharged from the bearing portions and the lubricant during the operation of the X-ray tube so that the gas may cause the lubricant to blow up with gas or bubbles from the bearing portions. When this phenomenon occurs, the bearing can not perform a stable dynamic pressure type sliding bearing operation for a long time, and the withstand voltage property of the X-ray tube is significantly deteriorated due to the the liquid metal lubricant scattered into the X-ray tube envelope.

SUMMARY OF THE INVENTION

The object of this invention is to provide a method of manufacturing and an apparatus for manufacturing rotary anode type X-ray tube, which can suppress the generation of gas from lubricant and bearing portion of an assembled X-ray tube and can prevent liquid metal lubricant from leaking, whereby stable bearing operation can be maintained.

According to the invention, there is provided a method of manufacturing a rotary anode type X-ray tube which comprises an anode target, a rotary structure to which the anode target is fixed, a stationary structure for rotatably supporting the rotary structure, sliding bearing portions defined between the rotary and stationary structures, which includes a bearing gap, spiral grooves, and a liquid metal lubricant applied to the spiral grooves and the bearing gap and a vacuum envelope in which the rotary and stationary structures are mounted, the manufacturing method comprising: applying step of applying the liquid metal lubricant in the bearing portions defined between the rotary and stationary structures; evacuating step of evacuating gas produced in the bearing portions while the bearing portions is heated at a temperature not lower than 200° C., after the applying step.

An apparatus practicing this method is characterized by comprising a vacuum bell jar, a holding and controlling device for holding a bearing portions and controlling the movement and mutual connection of the rotary structure and the stationary shaft externally of a vacuum bell jar, and a lubricant injector for supplying a liquid metal lubricant to the bearing portions mounted in the bell jar.

According to the manufacturing method of this invention, the bearing portions or the liquid metal lubricant can be cleaned and gas which would be generated therefrom is securely removed before the X-ray tube is finished such that the bearing surfaces gets wet well by the lubricant. Further, since leakage of a lubricant due to gas bubbles rarely occurs, a rotary anode type X-ray tube which can perform stable dynamic sliding bearing operation for a long time can be obtained.

According to this invention, liquid metal lubricating sliding bearing portions which generate few gas can be efficiently formed in a completed X-ray tube.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a longitudinal cross-sectional view of the main part of the X-ray tube after being assembled according to FIG. 2;

DETAILED DESCRIPTION OF THE PREFERRED EMBODIMENTS

The method and the apparatus for manufacturing an X-ray tube according to this invention will now be described by way of the preferred embodiments with reference to the accompanying drawings. The same elements and parts will be denoted by the same referential numerals throughout the specification.

Figure 1:
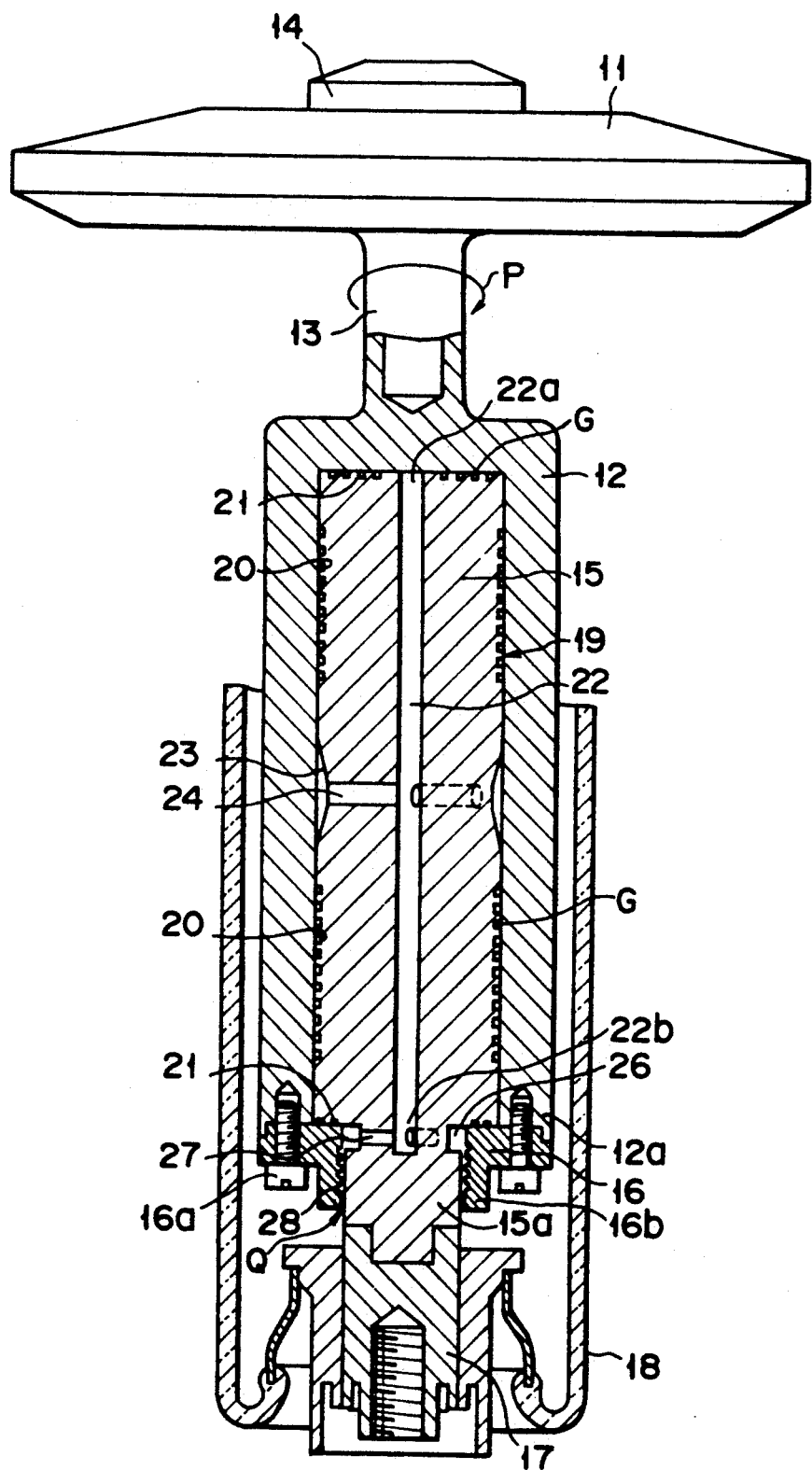
FIG. 1 is a longitudinal cross-sectional view of an X-ray tube manufactured according to the method of this invention.
Figure 2:
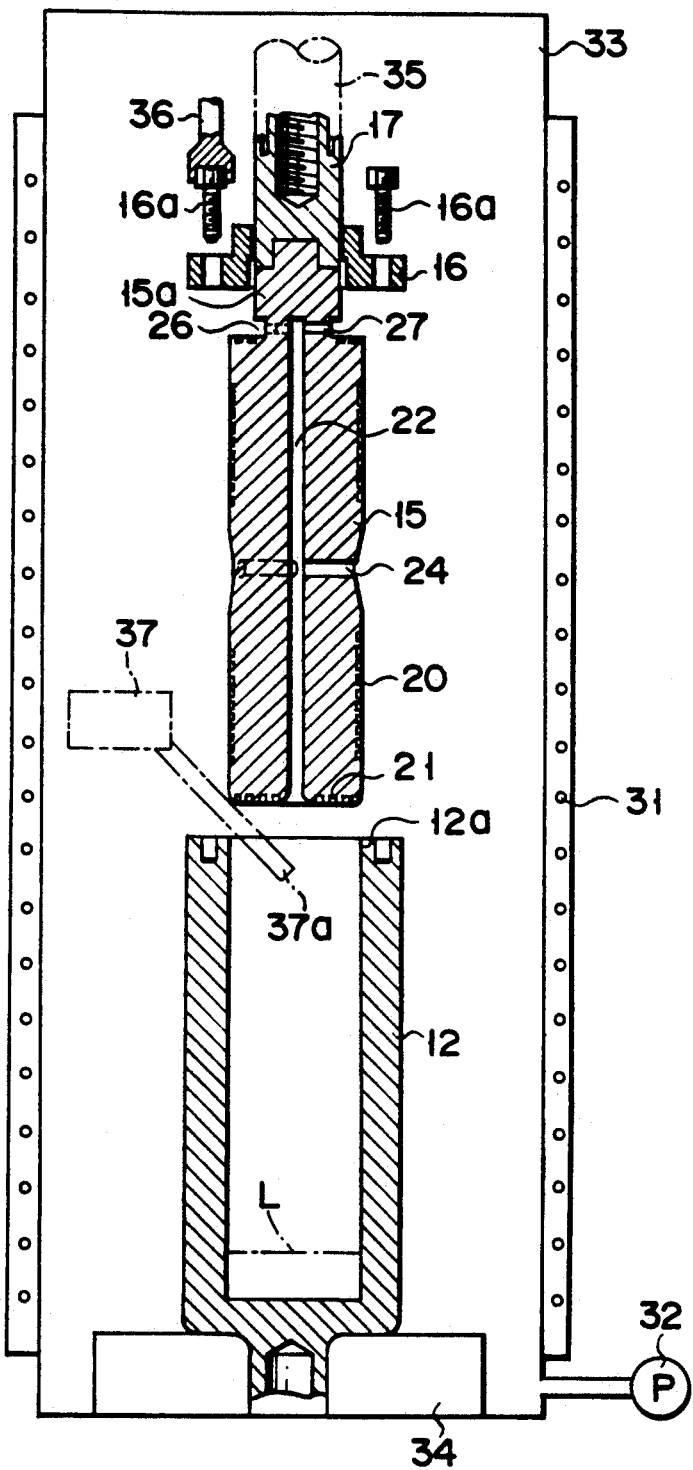
FIG. 2 is a longitudinal cross-sectional view showing a manufacturing step for manufacturing the X-ray tube shown in FIG. 1 and an apparatus for manufacturing the X-ray tube shown in FIG. 1.

FIGS. 1 to 3 show an X-ray tube and an intermediate product. As shown in FIG. 1, the assembled X-ray tube has a disc-like anode target 11 made of a heavy meal and fixed by a nut 14 to a rotary shaft 13 which projects from one end of a cylindrical rotary structure 12. The rotary structure 12 is concentrically and fixedly fitted in a rotor assembly (not shown) comprising a cylinder made of ferromagnetic material and a cylinder made of a material having a high electrical conductivity. A cylindrical stationary shaft 15 is inserted in the rotary structure 12. A small-diameter portion or a reduced diameter portion 15a is formed on the lower end portion (i.e., at the vicinity of an opening portion 12a) of the rotary structure 12. A closing member 16 surrounds the small-diameter portion 15a so as to substantially close the opening portion 12a and is fixed to the opening portion 12a of the rotary structure 12 by means of a plurality of bolts 16a. To the reduced diameter portion 15a of the stationary shaft 15, an anode supporting portion 17 made of iron is brazed for mechanically supporting the rotary structure 12 and the stationary shaft 15. The anode supporting portion 17 is hermetically connected to a vacuum envelope 18 made of glass.

As disclosed in the above-mentioned Disclosures, inner and outer surfaces of the rotary structure 12 and the cylindrical stationary shaft 15 which slide on each other constitute dynamic pressure type sliding bearing. Herringbone-patterned spiral grooves 20 and 21 are formed in the outer surface and both end faces of the stationary shaft 15 so as to constitute sliding bearing surfaces of the stationary shaft 15, as disclosed in the Disclosures. Those sliding bearing surfaces of the rotary structure 12 which face the sliding bearing surfaces of the stationary shaft 15 may be formed smooth or may be so grooved as to have spiral grooves if necessary. The bearing surfaces of the rotary structure 12 and the stationary shaft 15 are arranged to face each other and are separated from each other at a bearing gap G of about 20 micrometers. In the closing member 16, an annular cavity 26 is formed by annularly removing a part of the reduced diameter portion 15a of the stationary shaft 15. The closing member 16 has a cylindrical portion 16b spaced apart at a small gap Q from the reduced diameter portion 15a of the stationary shaft 15. A screw pump groove 28 is formed in the inner surface of the cylindrical portion 16b. The screw pump groove 28 and the gap Q constitute means for preventing lubricant from being leaked. The radial depth of the annular cavity 26 is sufficiently larger than the space Q.

In the stationary shaft 15, a lubricant chamber 22 is formed which extends through the axis of the stationary shaft 15. The upper opening 22a, shown in FIG. 1, of the lubricant chamber 22 communicates with the bearing gap G and the spiral grooves 21 as a thrust bearing 21. The central part of the outer periphery of the rotary structure 15 is slightly tapered to form a recessed portion 23. Three radial passages 24 are circumferentially separated by 120 degrees from one another and extend from the lubricant chamber 22 to the recessed portion 23, such that the chamber 22 communicates through the radial passages 24 and the recessed portion 23 with the bearing gaps G and the helical grooves 20 which act as two radial bearings separated by the recessed portion 23. In the lower end portion 22b of three radial passages 27 are provided which are circumferentially spaced by 120 degrees. The radial passages 27 communicate with the annular cavity 26 in such a manner that the lubricant chamber 22 communicates through the radial passages 27 and the annular cavity 26 with the bearing gap G and the spiral grooves as the thrust bearing portion. A liquid metal lubricant (not shown) is applied in the bearing portions 19 (including the helical groove 20 and the spiral groove 21), and both the lubricant chamber 22 and the radial passages 24 communicating therewith. Instead of forming the radial passages 27, however, the lubricant chamber 22 can terminate at an intermediate portion of the stationary shaft 15.

A stator or a magnetic coil (not shown) surrounds the vacuum envelope 18 and generates a rotating magnetic field so as to rotate a rotary anode at a high speed in the direction of an arrow P. Liquid metal lubricant is filled fully in the sliding bearing portions and can perform smooth dynamic pressure type sliding bearing operation. More specifically, the liquid metal lubricant is supplied from the central lubricant chamber 22 to the bearing gaps G, the radial passages 24, 27 and the spiral and helical grooves 20, 21 due to a partial pressure difference produced by the movement of the liquid metal lubricant. Thus, the lubricant carries out stable dynamic pressure type sliding bearing operation. Electron beams emitted from a cathode (not shown) are radiated on the anode target to irradiate X-rays. Most of heat generated in the target is dissipated by radiation and part of it is also dissipated to the outer atmosphere through the rotary structure 12, the liquid metal lubricant and the stationary shaft 15.

It will now be explained how to assemble the rotary anode structure. As shown in FIG. 2, the bearing parts of the bearing assembly are disposed in the vacuum bell jar 33 having a heater 31 and connected to an exhausting pump 32. The rotary structure 12 is mounted on an ultrasonic vibrator 34 used as a holder in such a manner that the opening portion 12a is directed upward. A stationary shaft holder 35 is provided in the vacuum bell jar 33 and supports the stationary shaft 15 such that the shaft 15 is positioned over the rotary structure 12. The closing member 16 is held by a holder (not shown) so as to surround the portion 15a of the stationary shaft 15. A plurality of bolts 16a for fixing the closing member 16 are held by tightening members 36. In the vacuum bell jar 33, a lubricant injector 37 is provided containing a liquid metal lubricant consisting of a gallium alloy (Ga alloy) or the like. As shown in FIG. 2, the lubricant injector 37 has an injecting nozzle 37a extending into the opening portion 12a of the rotary structure 12 such that a predetermined amount of lubricant is supplied into the rotary structure 12 by a control device (not shown) disposed outside of the bell jar 33. Temperature detectors (not shown) for detecting the temperature the structure 12 and shaft 15 heated by the heating device is also provided in the bell jar 33.

After the bearing portions and the control device have been arranged as shown in FIG. 2, the pressure of the interior of the bell jar 33 is reduced to such a high degree of vacuum of $10^{-3}$ Pa or more by the exhausting pump 32. The bearing parts or components (the rotary structure and stationary shaft 12 and 15) are heated to 200° C. or more (substantially 450° C., for example) at least for an hour by the heater 31 in such a way that gas absorbed by the components and included in the liquid metal lubricant is discharged and exhausted by the pump 32. This vacuum heat treatment allows the bearing portions to be cleaned and particularly the bearing surfaces to have a good wettability to the lubricant. The tip portion of the lubricant injecting nozzle 37a of the lubricant injector 37 is inserted in the opening portion 12a of the rotary structure 12 and a predetermined amount of the liquid metal lubricant is supplied to the interior of the rotary structure 12 from the lubricant injecting nozzle 37a, as shown in FIG. 2. In this figure, L designates the liquid metal lubricant which is supplied into the rotary structure 12. Gas in the liquid metal lubricant L and captured by the inner surface of the rotary structure 12 which contacts the lubricant is effectively discharged into the bell jar 33 by ultrasonic vibration and exhausted. The lubricant injector 37 is returned to the home position by the external control device and then the stationary shaft 15 is slowly lowered to be inserted into the rotary structure 12. In this condition, the heating treatment is continuously performed. The liquid metal lubricant L at the bottom of the rotary structure 12 flows in the bearing gaps and spiral grooves formed between the rotary structure 12 and the stationary shaft 15, the lubricant chamber 22 and the radial passages 24, and they get coated by the lubricant. When air or gas residual in these parts is discharged in a form of bubbles, the bubbles are moved upward, discharged outside of the bearing portions and exhausted by the pump 32. The gas is replaced by the lubricant in these parts and they get coated with the lubricant. The ultrasonic vibration accelerates the gas exhaust and the replacement of the gas bubbles with lubricant.

As shown in FIG. 3, after the step in which the stationary shaft 15 is inserted into the rotary structure 12, the opening portion 12a of the rotary structure 12 is covered with the closing member 16 and the member 16 is fixed to the rotary structure 12 by tightening the bolts 16a by the tightening member 36. Thereafter, heating and ultrasonic vibration are continuously performed in the vacuum. Then, gas is fully removed from the bearing portions and the lubricant. After vacuum heat treatment has been carried out for a predetermined time, gradual cooling is performed in the vacuum. In the assembled device, since the liquid metal lubricant fully enters the bearing gaps and the spiral grooves and the bearing surfaces are well wetted, a stable dynamic sliding bearing operation can be obtained. After the vacuum heat treatment step and the cooling step, the anode target 11 is secured to the rotary shaft 13 by the nut 14 and the anode supporting portion 17 is fitted in and hermetically sealed to a metal ring which is provided at the opening end of the vacuum glass envelope 18 so that the anode assembly is housed in the vacuum glass envelope 18. Thereafter, an evacuating step is performed. In the evacuating step, while the electron beam is emitted and impinged on the anode target to heat the anode assembly and to cause the heated parts of the anode assembly to discharge gas, the vacuum glass envelope 18 is evacuated to discharge gas outside of the envelope 18. A evacuating port of the envelope 18 is chipped off to seal the envelope so that the X-ray tube is finished.

Instead of using the lubricant injector, a predetermined amount of lubricant may be put in the rotary structure 12 previously. The highest temperature of the bearing portions during the lubricant filling step is set to the value higher than the highest temperature to which the temperature of the completed X-ray tube is reached during the operation of the X-ray tube. More specifically, the highest temperature of the bearing portions is set to 200° C. or more (preferably 300° C. to 700° C. more preferably 400 to 450° C). This results in the fact that little gas is discharged from the bearing portions and lubricant during the operation of the completed X-ray tube. In other words, the problem that lubricant together with gas is leaked out from the bearing portions rarely occurs.

It is more preferred that the highest temperature of the bearing portions during the lubricant filling step be set to a value higher than the highest temperature to which the temperature of the bearing portions is raised during the manufacturing step after the lubricant filling step (for example, during the exhausting step).

There will be described a modification of the manufacturing method shown in FIGS. 2 and 3. In the modification method, the metal lubricant is coated on the bearing surfaces of the stationary shaft 15 and rotary structure 12 and a small amount of the metal lubricant L is dropped into the bottom inner space of the rotary structure 12 in an atmosphere outside of the bell jar 33. Thereafter, the rotary structure 12 is located and the stationary shaft 15 is installed in the bell jar 33 in a same manner as that shown in FIG. 2 and the bell jar 33 is evacuated. In the vacuum space in the bell jar, the stationary shaft 15 is inserted into the rotary structure 12 and the metal lubricant flows into the bearing gap, the lubricant chamber 22 and so on. The heater 31 is energized to heat the assembly of the rotary structure 12 and the stationary shaft 15 provided with the metal lubricant and the envelope is continuously evacuated by the pump 32. Thus, the bearing portions are maintained at a predetermined temperature, i.e about 450° C., for one hour so that gas discharged from the bearing portions and the metal lubricant is evacuated and the metal lubricant reacts with a metal material of the bearing surfaces to form a thin reaction layer which has good wettability with the metal lubricant. Thereafter, the assembly in the bell jar 33 is cooled into a room temperature. The assembly is assembled in the vacuum envelope and the evacuating step is performed to finish the X-ray tube in a same manner as that of the first embodiment.

The stationary shaft 15 may be rotated in the rotary structure 12 at 3000 rpm in the vacuum condition or in the vacuum heating treatment step to sufficiently remove gas or bubbles in the bearing portions and improve the wettability between the lubricant and the bearing surfaces, after the stationary shaft 15 is inserted in the rotary structure 12. The rotation of the stationary shaft may not be successively continued but may be intermittently continued to improve the removal of gas or bubbles in the bearing portions. It is necessary for rotating the stationary shaft in the rotary structure that the metal lubricant is applied to the bearing surfaces of the stationary shaft and the rotary structure before the stationary shaft is inserted into the rotary structure, and the bearing portions are filled with the lubricant after the stationary shaft is inserted into the rotary structure. This lubricant applying permits the smooth rotation of stationary structure in the rotary structure in the heating and evacuating step.

Figure 4:
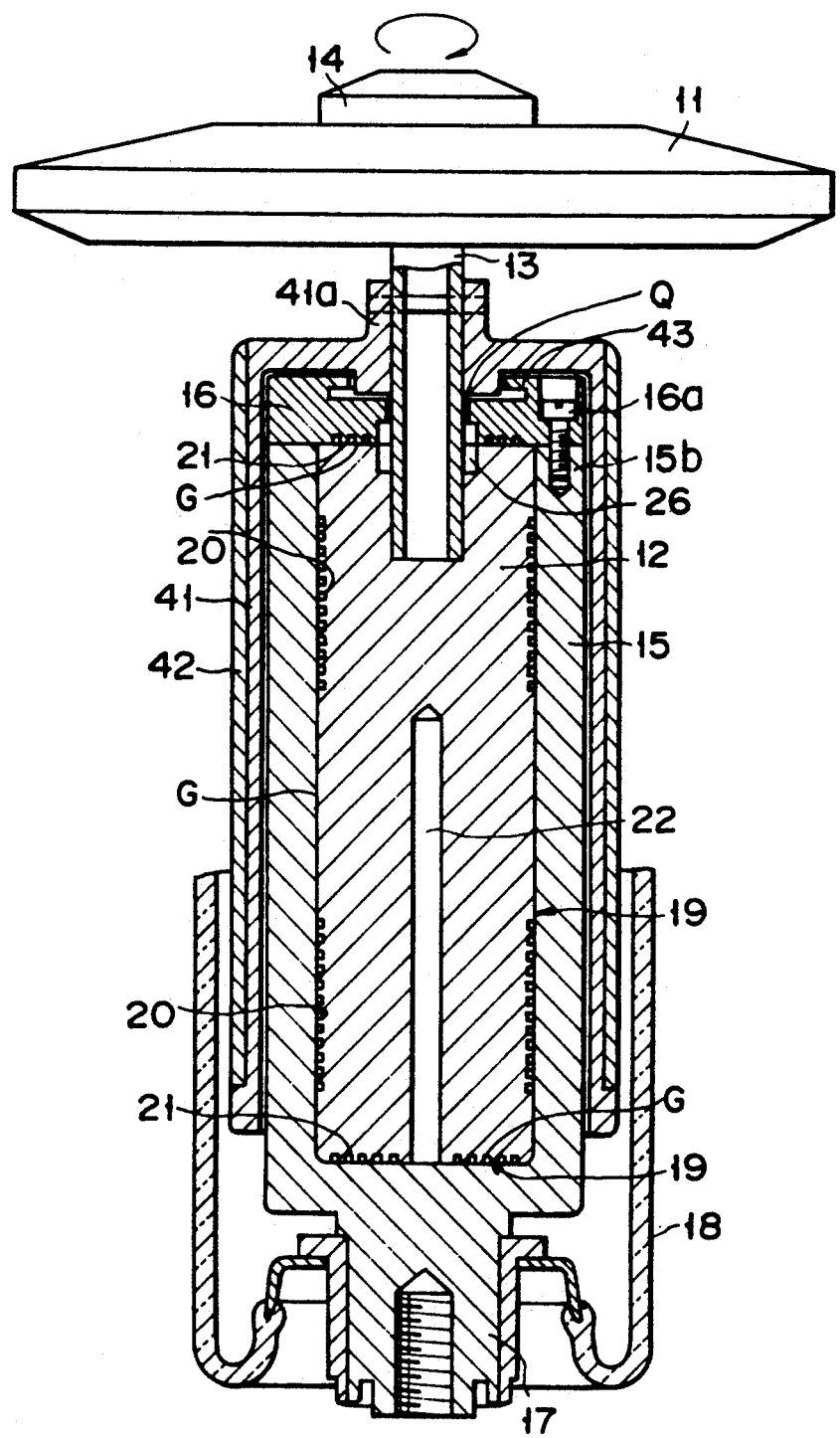
FIG. 4 is a longitudinal cross-sectional view of another embodiment of the X-ray tube manufactured according to this invention.

In the embodiment shown in FIG. 3, the rotary structure 12 to which the anode target 11 is fixed is hollow cylindrical, but it may be a cylindrical column member to which the anode target 11 is secured as shown in FIG. 4. To the upper portion of the cylindrical rotary structure 12, a hollow cylindrical rotary shaft 13 is fixed to which the anode target 11 is fastened. A hollow cylindrical stationary shaft 15 having a bottom end surrounds the rotary structure 12. A closing member 16 is tightened by means of a plurality of bolts 16a to an upper opening portion 15b of the stationary shaft 15. Around the stationary shaft 15 is coaxially disposed a ferromagnetic cylinder 41 acting as the rotor cylinder of a motor. The ferromagnetic cylinder 41 is coaxially fitted in the outermost cylinder 42 made of copper. The upper end portion 41a of the ferromagnetic cylinder 41 is mechanically fixed to the rotary shaft 13. The closing member 16 have an inner end face which contacts that upper surface of the rotary structure 12 and which spiral grooves 21 are formed. Recessed portions formed in the inner face of the closing member 16 and in the end face of the rotary structure 12 define an annular cavity 26. The cavity 26 communicates with a bearing portion 19 having a bearing gap G. A very small gap Q is provided between the closing member 16 and the rotary shaft 13 and a radially extending folding portion 43 is formed in the closing member 16 to prevent the lubricant from leaking from the cavity 26. A coating film having a wettability with the lubricant may be formed on the inner face of the folding portion 43 so as to ensure to capture the lubricant thereto.

Figure 5:
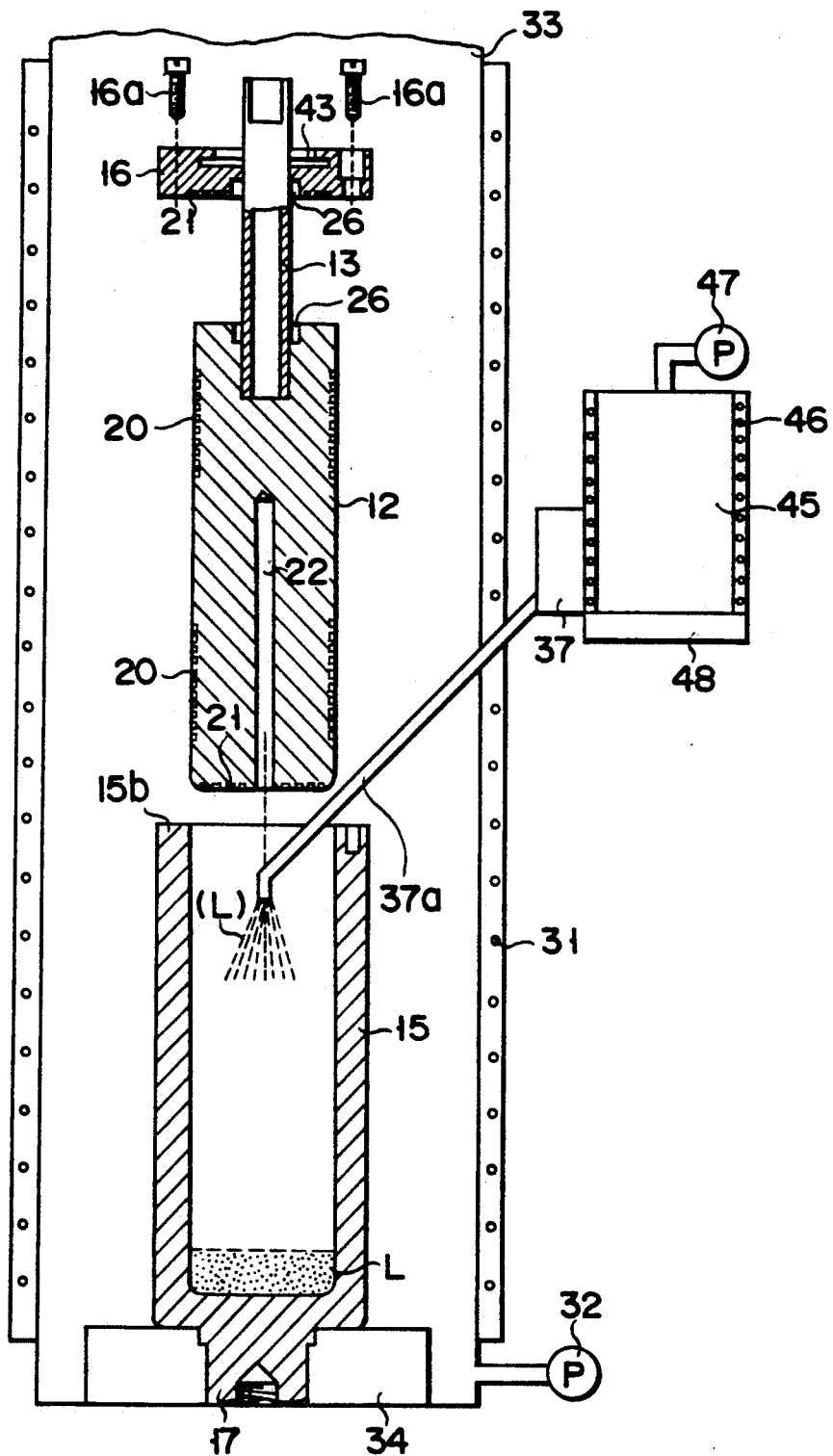
FIG. 5 is a longitudinal cross-sectional view showing a manufacturing step for manufacturing the X-ray tube shown in FIG. 4 and a apparatus for manufacturing the X-ray tube shown in FIG. 4.

It will now be described how to assemble the rotary anode structure. As shown in FIG. 5, the stationary shaft 15 is placed on the ultrasonic vibrator 34 in such a manner that the opening portion 15b of the stationary shaft 15 is directed upward. The rotary structure 12 to which the anode target 11 is not yet fixed, the closing member 16 and the bolts are positioned so as to be suspended. Besides the vacuum bell jar 33 is provided a lubricant pre-treating device 45 for performing vacuum heat treatment. The device 45 comprises a heater 46, a vacuum pump 47, an ultrasonic vibrator 48, a lubricant injector 37 for supplying a predetermined amount of lubricant and a nozzle 37a reciprocating in the vacuum bell jar 33.

The pressure of interior of the vacuum bell jar 33 is reduced to a high degree of vacuum, and gas is discharged from the heated bearing portions and exhausted. At the same time, liquid metal lubricant including a metal such as a Ga alloy is heated by means of a heater 46 to a temperature of 300° C. or more (about 450° C., for example) to repel the gas or bubbles. In this case, the lubricant is also vibrated by the ultrasonic vibrator 48 such that gas is securely removed from the lubricant. Thereafter, a predetermined amount of the lubricant at a high temperature is sprayed from the nozzle 37a of the lubricant injector 37 into the stationary shaft 15. The lubricant is vibrated and heated to remove gas therefrom. Then, the rotary structure 12 is lowered to be inserted in the stationary shaft 15 and the closing member 16 is tightened by a plurality of bolts 16a. The lubricant L enters the bearing gaps and the lubricant chamber 22. When gas is generated from the bearing portions and the lubricant chamber 22, gas bubbles are moved upward through the bearing portions and reach the annular cavity 26. The pressure of the gas is rapidly reduced therein and the gas is exhausted. The generated gas bubbles are replaced by the lubricant in the bearing gaps and the lubricant chamber 22. During this step, ultrasonic vibration is continued such that the gas is more discharged and more replaced by the lubricant. In a predetermined time after this step, gradual cooling is performed under a vacuum. After this step, little gas is released from the bearing portions and the lubricant, and the lubricant is suppressed from leaking into the vacuum envelope through the very small gap Q.

Material of the liquid metal lubricant may comprise Ga, Ga-In alloy, Ga-In-Sn alloy or the like which contains main metal Ga. However, it is not limited thereto. It may comprise such as Bi-In-Pb-Sn alloy which contains relatively large percentage of bismuth (Bi) or such as In-Bi alloy or In-Bi-Sn which includes relatively large percentage of indium (In). Since each of these metals has a melting point higher than the room temperature, it is preferred that the metal lubricant be preheated to a temperature higher than its melting point an thereafter rotated.

In addition, the vacuum heat treatment for the bearing portions in which the lubricant is applied may not be performed in the vacuum bell jar but may be performed with the evacuating step of exhausting the X-ray tube. That is, the metal lubricant is applied to the bearing portions in an atmosphere or a vacuum condition and an anode assembly of the X-ray tube in which the stationary and rotary structures are assembled to form the bearing portions and the anode target is fixed to one of the rotary and stationary structures is mounted in the vacuum glass envelope of the X-ray tube. Thereafter, the electron beam is impinged on the anode target to heat the anode assembly or the anode assembly is directly heated by an induced high frequency, while the anode target is continuously or intermittently rotated at 3000 rpm in the evacuating step. Thus, gas is discharged from the bearing portions and a reaction layer is formed on the bearing surfaces to improve a wettability of the bearing surface.

According to the manufacturing method of this invention, the bearing portions can be cleaned and gets wet in the lubricant and gas discharged from the bearing portion and/or lubricant can be securely removed. At the same time, gas bubbles can be securely replaced by lubricant. Accordingly, a rotary anode type X-ray tube which maintains a stable dynamic sliding bearing operation. Further, the apparatus according to this invention can efficiently perform vacuum-heat treatment of each part of the apparatus, effect lubricant injection and improve the assembly efficiency. This makes it possible to assemble rotary bearing portions which operates at a high reliability.

Additional advantages and modifications will readily occur to those skilled in the art. Therefore, the invention in its broader aspects is not limited to the specific details, and representative devices, and illustrated examples shown and described herein. Accordingly, various modifications may be without departing from the spirit or scope of the general inventive concept as defined by the appended claims and their equivalents.

What is claimed is:

1. A method of manufacturing a rotary anode type X-ray tube comprising an anode target, a rotary structure to which the anode target is fixed, a stationary structure for rotatably supporting the rotary structure, a sliding bearing portion defined between the rotary and stationary structures including a bearing gap, spiral grooves, and a liquid metal lubricant applied to the spiral grooves and the bearing gap, and a vacuum envelope in which the rotary and stationary structures are mounted, the manufacturing method comprising the steps of:

disposing the rotary and stationary structures in a vacuum jar before assembling the rotary anode type X-ray tube;

applying the liquid metal lubricant to at least one of the rotary and stationary structures;

exhausting the vacuum jar;

heating rotary and stationary structures to a temperature to evacuate gas from the rotary and stationary structures and the liquid metal lubricant while the rotary and stationary structures are disposed in the vacuum jar; and fitting the rotary and stationary structures together.

2. The method according to claim 1, wherein the temperature is higher than a temperature to which the bearing portion is heated when the X-ray tube operates.

3. The method according to claim 1, further comprising a step of rotating one of the rotary and stationary structures to evacuate the gas.

4. The method according to claim 1, further comprising a step of ultrasonically vibrating at least one of the rotary and stationary structures in the vacuum jar.

5. The method according to claim 1, wherein the applying step includes a step of inserting the rotary structure into the stationary structure.

6. The method according to claim 5, further comprising a step of ultrasonically vibrating at least one of the rotary and stationary structures in the vacuum jar after performing the applying step.

7. The method according to claim 5, wherein the liquid metal lubricant is heated to at least 300° C. prior to performing the applying step.

8. The method according to claim 5, wherein said applying step further includes a step of rotating one of the rotary and stationary structures in the vacuum jar after performing the inserting step.

9. The method according to claim 1, wherein the applying step includes a step of coating the lubricant on at least one of the stationary and rotary structures in an atmosphere outside of the vacuum jar before performing the disposing step.

10. The method according to claim 1, further comprising the steps of:

mounting the rotary and stationary structures in the vacuum envelope;

securing the anode target to the rotary structure; and heating the anode target to exhaust the vacuum envelope to assemble the X-ray tube.

11. The method according to claim 1, further comprising a step of mounting the rotary and stationary structures in the vacuum envelope to assemble said X-ray tube.

12. The method according to claim 11, further comprising a step of rotating one of the rotary and stationary structures in the vacuum jar while performing the heating step.

13. The method according to claim 1, wherein the temperature is at least 200° C.

* * * * *